Dec. 1, 1931.  V. O. LEVICK  1,833,970
AEROPLANE BLIND FLYING INSTRUMENT BOARD
Filed July 10, 1931   2 Sheets-Sheet 1
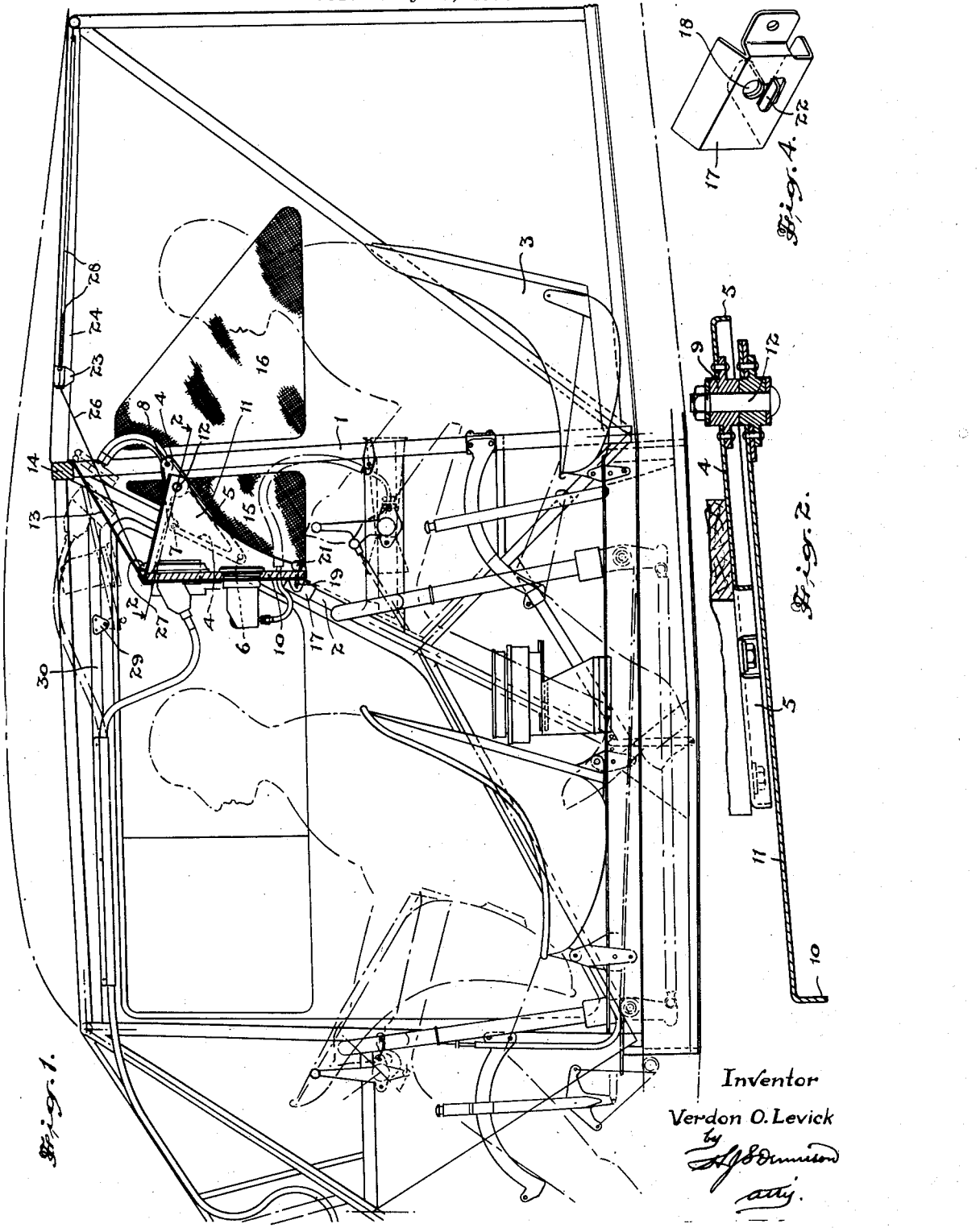
Inventor
Verdon O. Levick Dec. 1, 1931.  V. O. LEVICK  1,833,970
AEROPLANE BLIND FLYING INSTRUMENT BOARD
Filed July 10, 1931  2 Sheets-Sheet 2

Inventor
Verdon O. Levick

Patented Dec. 1, 1931

1,833,970

UNITED STATES PATENT OFFICE

VERDON O. LEVICK, OF TORONTO, ONTARIO, CANADA, ASSIGNOR TO THE DE HAVILLAND AIRCRAFT OF CANADA, LIMITED, OF TORONTO, CANADA

AEROPLANE BLIND FLYING INSTRUMENT BOARD

Application filed July 10, 1931. Serial No. 550,020.

The principal objects of this invention are to facilitate the instruction of flying pupils in the handling of a plane under "blind" flying conditions such as may be encountered in fog or snow and to provide a means for completely obscuring the vision of the pupil from seeing any objects outside the plane, while providing a complete duplicate set of instruments for his guidance in operating the plane.

A further and very important object is to provide a "blind flying" equipment which may be very readily placed in position or instantaneously removed to enable free access to the exit of the plane while maintaining the operating connections with the engine and outside equipment.

The principal features of the invention consist in the novel construction and arrangement of a hood member adjustably mounted within the cabin of the plane to swing upwardly toward the roof or to swing downwardly to form a visual barrier to the pupil occupying the rear seat in the plane and carrying the required flying, operating and navigation instruments flexibly connected to external appliances.

Further and important features consist in the means for supporting the pivotal member from the frame structure of the plane without injuring or weakening any of its members, and in providing resilient means for balancing the instrument board to prevent injury to the delicate instruments on the board being released from its locked positions, raised or lowered.

In the accompanying drawings, Figure 1 is a longitudinal sectional elevational view of the cabin of a "two seater" plane showing the movable instrument board in the "blind flying" position in full lines and in the raised position in dotted lines.

Figure 2 is an enlarged sectional view taken on the line 2—2 of Figure 1.

Figure 4 is an enlarged perspective detail of one of the fastening bolt keepers arranged on the cabin frame.

Figures 3, 5, 6:
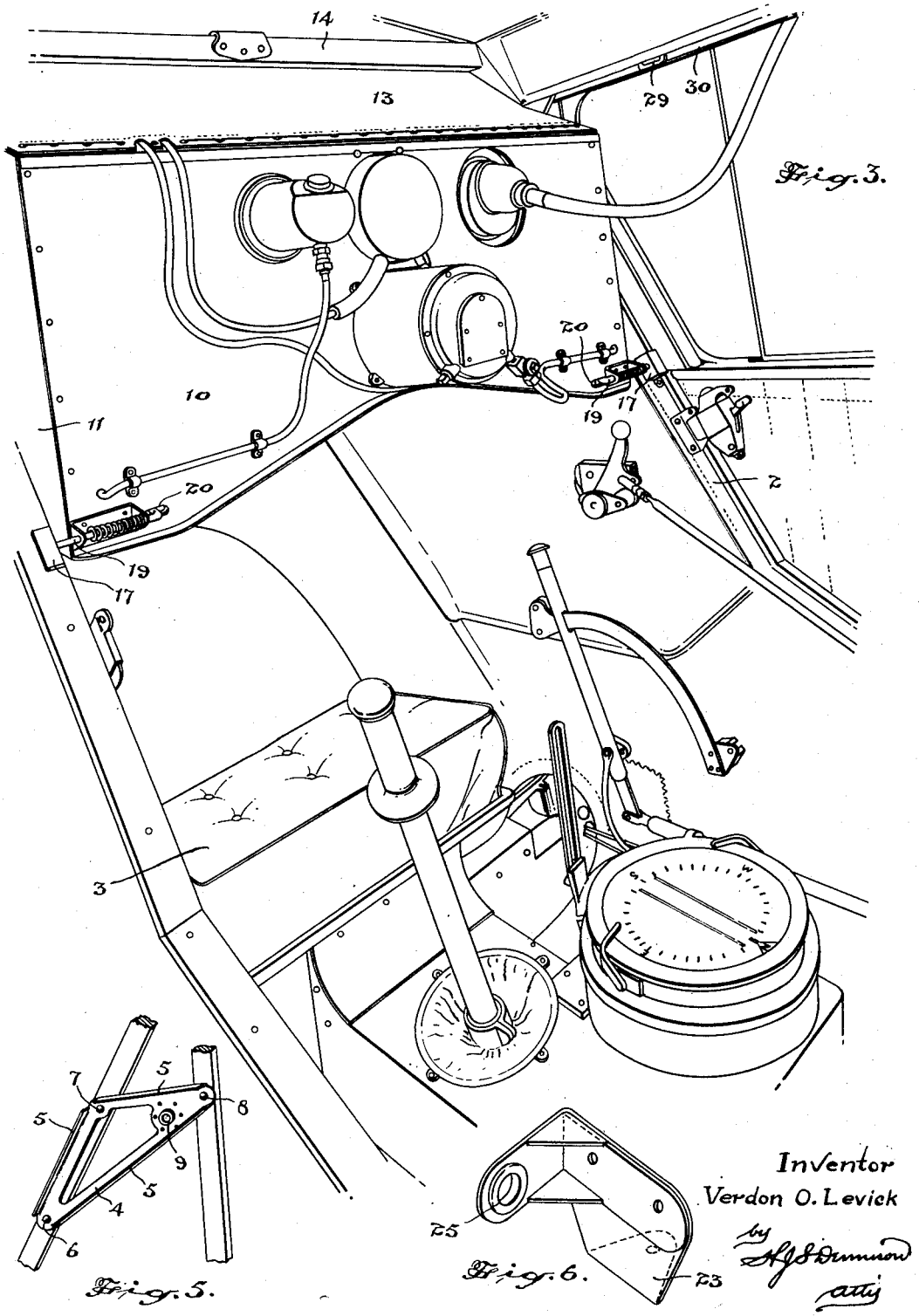
Figure 3 is an enlarged perspective view of the interior of the cabin of the plane showing the front side of the "blind flying" instrument board in its down or operative position.
Figure 5 is a perspective detail of one of the brackets for pivotally supporting the instrument board.
Figure 6 is a perspective detail of the guide for the pivotal board suspension cable.

In teaching the art of flying it is necessary that the pupil be fully instructed in the use of the various instruments provided, so that the machine will be under perfect control when external conditions are such as to render actual observation of landmarks impossible, such as when flying in a fog, and in order that such tuition shall be thoroughly practical it is necessary to obscure all external objects to the pupil while permitting the instructor full vision and control.

In instruction in "blind flying" it is important that the pupil shall not be hampered by any gear or equipment attached to his person and that free use of the flying equipment be afforded him.

The present invention provides all the desirable features and is so designed that it does not in any manner impair the usefulness of the plane for ordinary use or instruction in ordinary flying.

The device is herein shown applied to the "Puss Moth" type of plane which has a vertical strut 1 and a sloping strut 2 arranged in the cabin structure about midway between the two occupants, instructor and pupil, the pupil occupying the rear seat 3.

Triangular-shaped brackets 4 formed of sheet metal and preferably having the outer edges 5 flanged to provide rigidity, are secured by the bolts 6, 7 and 8 to the struts 1 and 2. A journal bearing 9 is secured in each bracket adjacent to the upper angle.

An instrument board 10 of a width substantially the width of the interior of the cabin is provided with substantially triangular shaped end plates 11 and studs 12 secured in the apex of these plates are journalled in the bearings 9 in the brackets 4.

A flexible curtain 13, which may be of leather or fabric is secured to the upper edge of the board 10 and extends upwardly and rearwardly therefrom and is secured to the cross spar 14. This curtain effectively closes the open space above the board when it is in the lowered or operating position, and when in this position the pupil's vision is completely obscured from observing objects outside of the cabin as the side windows 15 and 16 are "frosted".

Brackets or bolt keepers 17 preferably formed up of sheet metal are secured on the sloping struts 2 and are each provided with a hole 18 to receive the end of a spring bolt 19 mounted on the front side of the board. The board is provided with slots 20 through which the knob ends 21 of the bolts extend to the rear side of the board to enable the pupil to manipulate same. The brackets 17 are provided with flanges 22 projecting inwardly below the holes 18 to engage the bolt ends and limit the downward movement of the board and to direct the bolts into the "keeper" holes.

Brackets 23 are secured on the inner sides of the top rails 24 of the cabin structure to the rear of the cross spar 14 and these are each formed with an eye 25 through which a cable 26 is rove. The forward ends of the cables 26 are secured in lugs 27 formed on the upper edge of the end plates 11 adjacent to the instrument board and long coiled springs or other elastic members 28 are secured at one end to the other ends of the cables and at the other end to the cabin frame. The members 28 are tensioned to support the board above its locked "down" position to prevent it from dropping to its limit and possibly injuring the instruments carried thereon. When the board is lowered it is pulled downwardly against the tension of the members 28 and locked by the bolts 19.
Brackets 29 are secured to the longitudinal top bars 30 of the cabin structure to be engaged by the bolts 19 when the board is raised to the position shown in dotted lines in Figure 1.
The board 10 has mounted on its forward side the various instruments such as "Artificial horizon", "Air speed gauge", "R. P. M. gauge", "Altimeter" etc., which are required in the maintenance of the plane in complete operative control and the dials of these gauges are visible to the pupil when the board is lowered while the board though completely obscuring outside vision does not interfere with full vision of throttle, compass stick and other equipment arranged in the lower part of the cabin. Further, it permits the pupil seeing the instructor who sits in front of him so that his confidence may be maintained though he must conduct his flying entirely by his instruments.

The various instruments are fixed to the board but as certain of these have considerable depth they are preferably mounted on trunnions—to permit them to swing when the board is raised.

The various instruments are connected to the engine and outside devices such as the necessary Venturi tubes by flexible connections as shown arranged on the forward side of the board and these tubes are looped as required to extend to the fixed connections on the frame-work of the craft and permit the free swinging of the board to either raised or lowered positions.

It is an important factor that the duplicate set of instruments carried by the movable board are supported securely and in a position practically the duplicate of the front pilot's set yet they can be moved to clear the pupil pilot in an instant so that he can reach the exit without danger of fouling.

The equipment is extremely light, barely more than the weight of the instruments and the installation requires no holes to be bored in the frame structure which are not otherwise there, that is to say, all bolts or rivets used to support the device are a part of the normal structure of the plane.

In using this device, the instrument board is placed in the raised position. The pupil pilot takes his seat in the rear of the cabin for ordinary instruction with the instructor pilot in front.

When blind flying is to be practiced the pupil releases the bolts 19 from the top brackets 29 and swings the board downward and locks it to the brackets 17. His view of outside is then completely obscured and he practices "blind flying" by the use of his instruments, always seeing his instructor and having the mental security of his presence.

When his instruction in "blind flying" is completed or in the event of any untoward occurrence, the bolts are released and the board is swung upward completely out of the way.

What I claim as my invention is:—

1. In an aeroplane, the combination with the frame structure, of an instrument board adjustably mounted on said frame structure and adapted to be moved to and from the position in front of the pupil pilot, flying instruments mounted on said board, and flexible connections from said instruments to external appliances.

2. In an aeroplane, the combination with the frame structure, of an instrument board carrying suitable flying instruments, said board having end plates pivotally connected to the frame and adapted to permit the swinging of said board upwardly to clear the pupil pilot's vision or downwardly to obstruct his view of external appliances, and means maintaining a constant connection between said instruments and external appliances.

3. In an aeroplane, the combination with the cabin structure, of an instrument board carrying suitable flying instruments, flexible connections from external appliances to said instruments, end plates extending at right angles to said board, pivots rigidly mounted on the cabin frame and connected to said end plates, a flexible curtain extending across said board connected to its upper edge and to the roof of the aeroplane, means for locking said board to a lower position obstructing the vision of the pupil pilot of external objects, and means for locking said board in a raised position swung upwardly on its pivots to remove same from obstructing the pupil's vision.

4. In an aeroplane having vertical and sloping struts arranged between the fore and aft seats, triangular metallic brackets spanning the space between said vertical and sloping struts and each having a journal bearing therein, triangular plate members having studs secured thereto rotatably mounted in the journals in said triangular plates, an instrument board rigidly secured to and extending between said triangular plates, suitable flying instruments arranged on said board, flexible connections from said flying instruments to external appliances permitting the free swinging of the board, a flexible curtain extending upwardly from the upper side of the board to the roof of the cabin, and means for locking said board in its raised and lowered positions.

5. In an aeroplane the combination with the cabin frame, of pivot supports secured to the frame, plates pivotally mounted on said pivot supports, an instrument board extending between and secured to said plates, a flexible curtain extending from the top of said instrument board to the roof of the cabin, a cable secured to the instrument board extending upwardly and rearwardly therefrom, a guide for said cable, and a resilient member connected at one end to said cable and at the other end to said frame.

6. In an aeroplane, the combination with the frame thereof, of a hood member pivotally mounted at its ends to the sides of the frame and adapted to swing downwardly to obstruct the pupil pilot's vision of objects external to the plane and to swing upwardly to clear the pupil pilot's vision, instruments pivotally mounted on said hood, flexible connections leading from said instruments to fixed appliances on the plane, and means for holding said hood in its raised or lowered position.

7. In an aeroplane, an instrument board having angularly extending ends, supports arranged upon the frame of the plane pivotally connected to the ends of said board, flying instruments carried on said board having flexible connections with external appliances, slots extending longitudinally of said board, spring bolts slidably mounted on said board having their heads extending through said slots, keepers mounted on the aeroplane frame adapted to be engaged by said bolts, and means for obscuring the vision of above when in its lowered position.

8. In a cabin aeroplane, the combination with the frame having struts extending upwardly between the fore and aft seats, an instrument board having angularly extending ends pivotally supported from said struts, said board being adapted to swing upwardly close to the roof of the cabin and to swing downwardly to obscure the vision of the rear pilot, a flexible curtain connecting the top of the instrument board with the roof of the cabin, means for locking the board in its raised and lowered positions, and flexible means mounted in the cabin and connected with the pivotal instrument board adapted to support the board flexibly in an intermediate position between the upper and lower locking means.

VERDON O. LEVICK.